E. McOUAT.
MUSIC CHART.
APPLICATION FILED JULY 17, 1919.
1,353,486.   Patented Sept. 21, 1920.
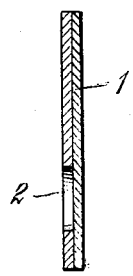
Inventor
Elizabeth McOuat
By her Attorney

UNITED STATES PATENT OFFICE.

ELIZABETH McOUAT, OF NEW YORK, N. Y.

MUSIC-CHART.

1,353,486.  Specification of Letters Patent.  Patented Sept. 21, 1920.

Application filed July 17, 1919. Serial No. 311,445.

*To all whom it may concern:*

Be it known that I, ELIZABETH McOUAT, a subject of the King of Great Britain, residing at the city, county, and State of New York, have invented certain new and useful Improvements in Music-Charts, of which the following is a specification.

My invention relates to apparatus for use in teaching the art of musical scale building. The invention is designed to encourage children, or other pupils, to play the scales by ear by providing them with charts upon which they can readily indicate the notes they have played. The apparatus may also be used in teaching the scales theoretically, but it is better that the pupil's first acquaintance with the scales should come through hearing rather than through reasoning. Before beginning the scale-building it is desirable that the pupil should be able to sing the syllables. In those exceptional cases in which the pupil is unable to sing he must be able to recognize the scale when it is played, to associate each tone mentally with its syllable, and to detect any tone that is misplayed.

The invention consists, generally, of a plurality of charts, one for each musical scale, each chart bearing two registering series of fixed characters representing the notes of the scale; one series indicating the relative pitch of the eight notes of the scale; the other series corresponding to the white keys of a piano from any desired keynote; and a plurality of markers or disks attachable to the charts for indicating any modification by flats, sharps, double sharps, or natural signs, which may be required in forming a scale of a given keynote.

In the accompanying drawings, Figure 1 is a plan view of the chart for the scale of D major; Fig. 2 is a cross section on the line 2—2 of Fig. 1; Fig. 3 is a plan view of one of the markers or disks employed in recording the variations in pitch required in building the scale; and, Fig. 4 shows the chart with the markers in position thereon and with the key signature card juxtaposed.

It is to be understood that my invention comprises apparatus for building all musical scales and that the scale of D major has been selected for illustration merely as an example. In each instance the construction and arrangement of the charts are the same except that the alphabetical characters are varied as required by the particular keynote, and that, in the case of the minor scales, the syllabic notation beginning with "Lah" and ending with "Lah" is employed to denote the relative pitch of the notes.

Referring to the drawings, 1 indicates a chart made of cardboard or other suitable material marked with eight divisions representing the eight notes of a diatonic scale. The chart bears a series of characters indicating the relative pitch of the notes, such as the syllables "Doh" to "Doh," or the numbers 1 to 8, depending upon the system of notation used; together with a second series giving the alphabetical characters, or other marks, corresponding to the white keys of a piano from any desired keynote. For example, in the chart illustrated in Fig. 1 the first mentioned characters are indicated by the syllables "Doh" to "Doh'" while the last mentioned characters are indicated by the letters "$d$" to "$d'$," respectively.

An opening or shallow hole 2 is formed in each division of the chart, adjacent to the alphabetical character for receiving the markers or disks 3 whereby modifications in pitch are indicated. The markers or disks are made to fit into the openings and they each bear a character, such as a sharp, flat, or natural, required for building the various scales.

A second set of markers having characters of a different color or otherwise distinguished from the markers 3 used in building the scales may be provided. These auxiliary markers are similar in construction to the markers 3 and are intended to be exchanged for the latter, after the scale has been built, in order to indicate, in the major scales, the last flat or sharp added, and, in the minor scales, the notes which are foreign to, or contradict the signature.

The apparatus includes a series of cards 4 each bearing one of the various key signatures and adapted to be placed in juxtaposition to its companion chart as shown in Fig. 4.

The manner in which the apparatus is used is as follows:

In building the scale of any keynote, the pupil is given the chart of that keynote and is instructed to build the scale by ear by recording on the chart, by means of the markers 3, any alteration in pitch of the tones that may be required. For example, assuming that the pupil is required to build the scale of D major, he would be given the chart shown in Fig. 1 and told to play the scale on a piano. In doing this he would find, by his sense of hearing, that both $f$ and $c$ require sharps and he would accordingly insert markers bearing the sharp sign in the openings in the chart adjacent to those letters.

After the pupil has gained some facility in building the scales he may count the flats or sharps in each one as he finishes it and then add the proper signature card. With the various charts arranged in order—according to the number of flats or sharps—and the proper signatures attached, it is a simple matter to discover which flat or sharp is used in any scale that was not in the preceding one. This, when found, can be made to stand out from the others by substituting one of the auxiliary markers for the marker used in building the scale. In this manner the pupil may be led to observe that the last sharp added to a scale, and consequently to its signature, is always the 7 or Te of the scale, and that the last flat is the 4 or Fah of the scale.

To show how the sharp scales follow each other in succession of ascending fifths, the scale charts may be arranged with the Doh, Ray, Me, Fah, in alinement with the Soh, Lah, Te, Doh of the preceding scale. Similarly the succession of flat scales in descending fifths may be shown by placing the Soh, Lah, Te, Doh of each scale in alinement with the Doh, Ray, Me, Fah of the preceding scale.

The scale of A minor is used as the pattern for the minor scales, both harmonic and melodic. After the minor scales have been built, the correct signatures can be discovered by comparing each with its relative major and the variations from the signatures may then be indicated by the auxiliary markers. The natural signs will not be needed when building the scales by ear, but must, obviously, be used after the signatures have been added.

What I claim is:

A plurality of music charts, each bearing two registering series of fixed characters representing the notes of a scale; one series corresponding to the white keys of a piano up from any desired keynote; the other series giving the syllables of the diatonic scale from Doh; and, markers attachable to the charts to indicate a change of pitch of notes of the first-mentioned series; whereby the two series may be made to indicate the same scale.

ELIZABETH McQUAT.